United States Patent [19]
Lipper

[11] 3,826,538
[45] July 30, 1974

[54] AUTOMOTIVE WHEEL
[75] Inventor: Ray W. Lipper, Newport Beach, Calif.
[73] Assignee: Center Line Tool Co., Inc., Los Angeles, Calif.
[22] Filed: Feb. 9, 1973
[21] Appl. No.: 331,041

[52] U.S. Cl. ..... 301/63 DD, 301/63 DS, 301/63 PW
[51] Int. Cl. ............................................. B60b 3/08
[58] Field of Search ......... 301/63 DD, 63 R, 63 DS, 301/63 PW, 64 R; 152/396

[56] References Cited
UNITED STATES PATENTS

| | | | |
|---|---|---|---|
| 1,869,318 | 7/1932 | Swain | 301/63 DS |
| 3,357,747 | 12/1967 | Eldred | 301/63 DS |
| 3,369,843 | 2/1968 | Prew | 301/63 PW |
| 3,582,141 | 6/1971 | Kelsey | 301/64 R |

FOREIGN PATENTS OR APPLICATIONS

| | | | |
|---|---|---|---|
| 605,410 | 7/1948 | Great Britain | 301/63 DD |
| 811,437 | 6/1951 | Germany | 301/63 DD |

*Primary Examiner*—M. Henson Wood, Jr.
*Assistant Examiner*—Victor N. Sakran
*Attorney, Agent, or Firm*—Philip M. Hinderstein

[57] ABSTRACT

A drawn aluminum wheel for use with automotive vehicles. The present wheel comprises: first and second generally cupshaped wheel halves, each of the wheel halves having a center section, an integral rim section, and a central opening in the center section, the wheel halves being positioned with the center sections back-to-back and the central openings coaxial; and a centering element including a disc-shaped portion having a central opening therein and an integral cylindrical collar along the inner circumference thereof, the centering element being positioned between the wheel halves with the collar extending into the central openings therein, thereby aligning the wheel halves. O rings positioned within grooves on opposite sides of the disc-shaped portion of the centering element form an air-tight seal between the centering element and each of the wheel halves. The wheel halves are connected together, preferably by rivets.

1 Claim, 3 Drawing Figures

PATENTED JUL 30 1974  3,826,538

AUTOMOTIVE WHEEL

BACKGROUND OF THE INVENTION

1. Field of the Invention

The present invention relates to high performance, decorative wheels and, more particularly, to a two-piece wheel construction having novel means for aligning the wheel halves and forming an air-tight seal therebetween.

2. Description of the Prior Art

Conventional wheels for automotive vehicles are manufactured in one of two principal ways. The most common method consists of forming a one-piece center section, forming a rim section, and welding the center section to the rim section. The rim section is generally rolled from flat stock and then bent into a circular configuration, the opposite ends being welded together. The periphery of the center section is then welded to the finished rim. The other method consists of casting the wheel in one piece. This method often uses magnesium.

Neither of the above construction methods is entirely satisfactory. The first method requires several steps including forming and welding and is, therefore, generally time consuming and expensive. The second method is even more expensive and is, therefore, limited to high performance and decorative applications.

Because of the above problems, it has been proposed to construct wheels utilizing two cup-shaped wheel halves which are positioned in back-to-back relationship and connected together. However, such wheels have been unsuitable heretofore for several reasons. In the first instance, difficulties have been encountered in aligning the two wheel halves and the finished wheel has been generally structurally unstable. Problems have also existed in forming an air-tight seal between the two wheel halves.

SUMMARY OF THE INVENTION

In accordance with the present invention, the time consuming, expensive manufacturing procedures inherent in conventional techniques for manufacturing wheels have been solved by providing a novel construction of two-piece wheel. The present wheel eliminates the costly casting or multiple step forming and welding procedures by drawing from aluminum first and second generally cup-shaped wheel halves and connecting such wheel halves in back-to-back relationship. According to the present invention, the present wheel also includes a novel centering element for aligning the two wheel halves and for holding such halves in a structurally stable condition. The centering element incorporates means for forming an air-tight seal with the wheel halves to prevent leakage from the tire used with the wheel. Finally, the present wheel is attractive and has performance characteristics which are equal to or better than existing wheel constructions.

Briefly, the present wheel comprises: first and second generally cup-shaped wheel halves, each of the wheel halves having a center section, in integral rim section, and a central opening in the center section, the wheel halves being positioned with the center sections back-to-back and the central openings coaxial; and a centering element including a disc-shaped portion having a central opening therein and an integral cylindrical collar along the inner circumference thereof, the centering element being positioned between the wheel halves with the collar extending into the central openings therein, thereby aligning the wheel halves. O rings positioned within grooves on opposite sides of the disc-shaped portion of the centering element form an air-tight seal between the centering element and each of the wheel halves. The wheel halves are connected together, preferably by rivets.

OBJECTS

It is therefore an object of the present invention to provide a high performance, decorative wheel.

It is a further object of the present invention to provide a two-piece wheel construction having novel means for aligning the wheel halves.

It is a still further object of the present invention to provide a two-piece wheel construction having novel means for forming an air-tight seal between the wheel halves.

It is another object of the present invention to provide a wheel including first and second generally cup-shaped wheel halves and a novel centering element for aligning the wheel halves.

Still other objects, features, and attendant advantages of the present invention will become apparent to those skilled in the art from a reading of the following detailed description of the preferred embodiment constructed in accordance therewith, taken in conjunction with the accompanying drawings wherein like numerals designate like parts in the several figures and wherein:

DESCRIPTION OF THE PREFERRED EMBODIMENT

Figures 1, 2, 3:
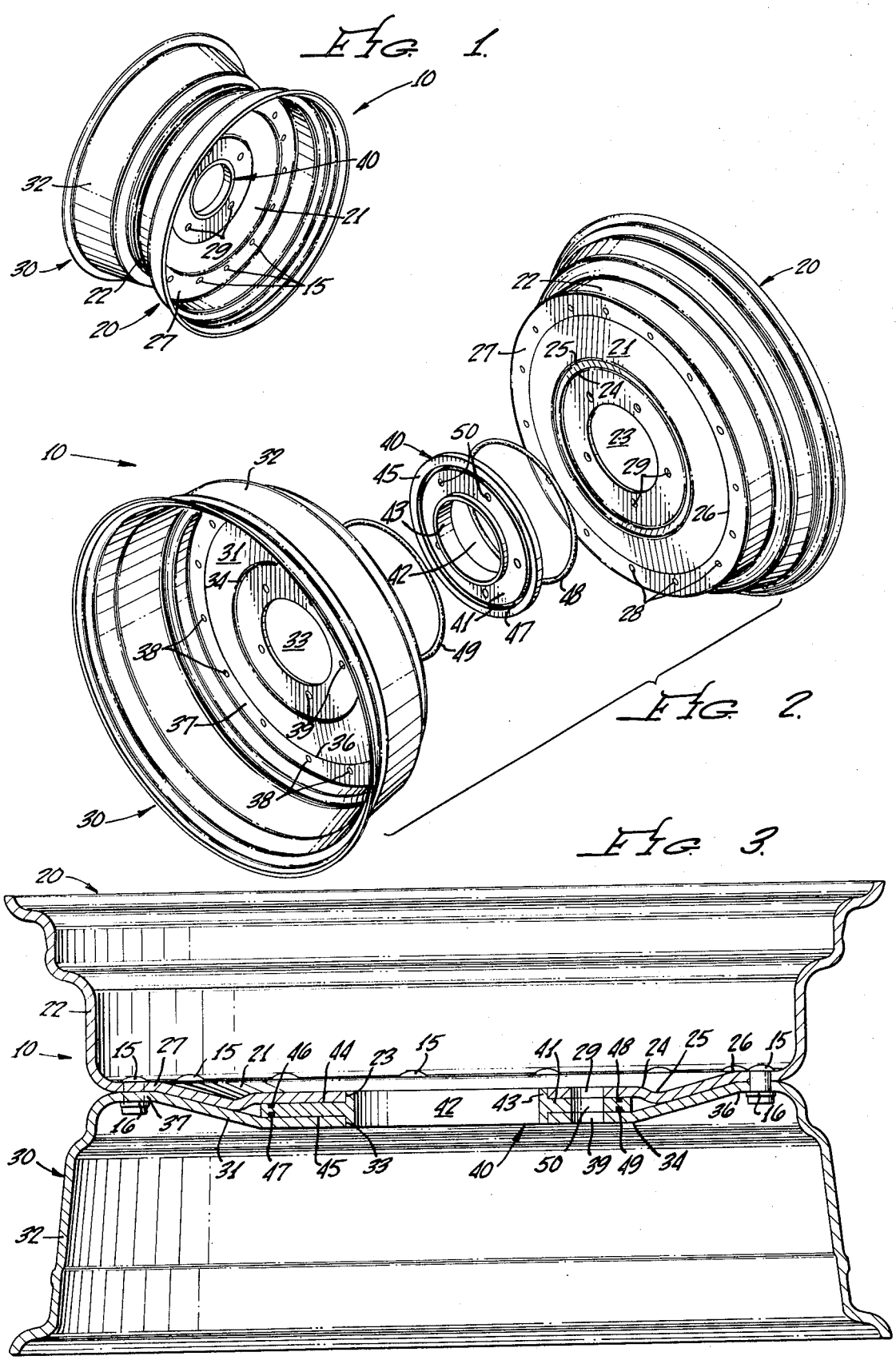
FIG. 1 is a perspective view of the present wheel looking from the front thereof.
FIG. 2 is an enlarged, exploded, perspective view of the wheel of FIG. 1 looking from the back thereof.
FIG. 3 is an enlarged longitudinal sectional view of the wheel of FIGS. 1 and 2 taken through the longitudinal axis thereof.

Referring now to the drawings, there is shown a wheel, generally designated 10, constructed in accordance with the teachings of the present invention. Wheel 10 comprises first and second generally cup-shaped wheel halves 20 and 30, wheel half 20 being the front half of wheel 10 and wheel half 30 being the back half of wheel 10. Wheel halves 20 and 30 have center sections 21 and 31, respectively, and integral rim sections 22 and 32, respectively. Thus, each of wheel halves 20 and 30 is made in one piece, preferably from a material such as aluminum. Furthermore, because of the cup-shaped appearance, each of halves 20 and 30 may be drawn in a punch press in accordance with known manufacturing procedures.

Rim sections 22 and 32, when taken together, have the appearance of a conventional wheel rim and will not be described further hereinafter. On the other hand, center sections 21 and 31 of wheel halves 20 and 30, respectively, are substantially planar and are parallel throughout the entire lengths thereof. Center sections 21 and 31 of wheel halves 20 and 30 have central openings 23 and 33, respectively, therein.

Wheel 10 further comprises a centering element, generally designated 40. Centering element 40 includes a disc-shaped portion 41 having a central opening 42 therein and a cylindrical collar 43 which is preferably made integral with the inner circumference of disc-shaped portion 41. That is, and as shown in FIG. 3, centering element 40 has a T shaped cross section. In addition, the outer diameter of collar 43 of centering element 40 is approximately equal to the diameter of central openings 23 and 33 in wheel halves 20 and 30, respectively. Furthermore, the length of the portions of collar 43 which extend beyond the sides 44 and 45 of disc-shaped portion 41 is equal to the width of center sections 21 and 31 of wheel halves 20 and 30, respectively.

Wheel halves 20 and 30 are adapted to be positioned in back-to-back relationship with disc-shaped portion 41 of centering element 40 therebetween. Then, by extending collar 43 of centering element 40 into central openings 23 and 33 in wheel halves 20 and 30, respectively, wheel halves 20 and 30 are accurately aligned relative to each other. Thus, centering element 40 not only permits registration between wheel halves 20 and 30, but adds structural stability and rigidity to wheel 10.

The portions of center sections 21 and 31 of wheel halves 20 and 30, respectively, immediately surrounding central openings 23 and 33, respectively, are in contact with opposite sides 44 and 45 of centering element 40. Upon reaching the outer circumference of centering element 40, center section 31 of wheel half 30 is bent along a circle 34 towards center section 21 and center section 21 of wheel half 20 is bent along a circle 24 toward center section 31. Upon coming into contact with each other, center section 21 of wheel half 20 is bent along a circle 25 so as to extend in contact with center section 31 of wheel half 30, with both center sections 21 and 31 extending slightly axially in the direction of the front of wheel 10. Upon reaching circles 26 and 36 of equal diameters, center sections 21 and 31, respectively, are bent so that the remaining areas 27 and 37 of center sections 21 and 31, respectively, are perpendicular to the axis of wheel 10.

Areas 27 and 37 of center sections 21 and 31, respectively, of wheel halves 20 and 30, respectively, have an identical series of mating holes 28 and 38, respectively, extending therethrough, holes 28 and 38 being positioned along a circle which is coaxial with central openings 23 and 33, respectively. Holes 28 and 38 permit the connection of wheel halves 20 and 30 by positioning fastening means, such as rivets 15 therethrough. Rivets 15 may include washers 16 to prevent damage to the aluminum from which wheel halves 20 and 30 are formed.

Wheel 10 further comprises means for forming an air-tight seal between centering element 40 and each of wheel halves 20 and 30. More specifically, centering element 40 has annular grooves 46 and 47 in sides 44 and 45, respectively, grooves 46 and 47 preferably having equal diameters. O rings 48 and 49 are positioned within grooves 46 and 47, respectively, whereby O rings 48 and 49 contact sides 44 and 45, respectively, of disc-shaped portion 41 of centering element 40 and the adjacent center sections 21 and 31, respectively, of wheel halves 20 and 30, respectively. Thus, O rings 48 and 49 form an air-tight seal between centering element 40 and wheel halves 20 and 30, preventing air leakage from the tire with which wheel 10 is utilized.

Finally, center sections 21 and 31 of wheel halves 20 and 30, respectively, and centering element 40 have an identical series of mating holes 29, 39, and 50, respectively, extending therethrough, along a circle which is coaxial with central openings 23, 33, and 42, respectively. Holes 29, 39, and 50 are positioned in a conventional manner to receive the threaded studs which permit connection of wheel 10 to an automotive vehicle.

It can therefore be seen that in accordance with the present invention, the time consuming, expensive manufacturing procedures inherent in conventional techniques for manufacturing wheels have been solved by providing a novel construction of two-piece wheel 10. Wheel 10 eliminates the costly casting or multiple step forming and welding procedures by drawing from aluminum first and second generally cup-shaped wheel halves 20 and 30 and connecting such wheel halves in back-to-back relationship. Wheel 10 also includes a novel centering element 40 for aligning wheel halves 20 and 30 and for holding such halves in a structurally stable condition. Centering element 40 incorporates O rings 48 and 49 for forming an air-tight seal with wheel halves 20 and 30 to prevent leakage from the tire used with wheel 10. Finally, wheel 10 is attractive and has performance characteristics which are equal to or better than existing wheel constructions.

While the invention has been described with respect to a preferred physical embodiment constructed in accordance therewith, it will be apparent to those skilled in the art that various modifications and improvements may be made without departing from the scope and spirit of the invention. Accordingly, it is to be understood that the invention is not to be limited by the specific illustrative embodiment, but only by the scope of the appended claims.

I claim:

1. A wheel comprising:

first and second generally cup-shaped wheel halves, each of said wheel halves having a center section, an integral rim section, and a central opening in said center section, said wheel halves being positioned with said center sections back-to-back and said central openings coaxial, said center sections of said wheel halves being parallel throughout essentially the entire lengths thereof;

a centering element including a disc-shaped portion having a central opening therein and an integral cylindrical collar along the inner circumference thereof, said centering element being positioned between said wheel halves with said collar extending into said central openings in said wheel halves thereby aligning same, the radially inward portions of said center sections of said wheel halves being in contact with the opposite sides of said disc-shaped portion of said centering element, the portions of said center sections of said wheel halves which are radially outward from said disc-shaped portion of said centering element being in contact with each other;

means for forming an air-tight seal between said centering element and each of said wheel halves; and means for connecting said wheel halves.

* * * * *